United States Patent
Yamamoto

(10) Patent No.: US 7,753,431 B2
(45) Date of Patent: Jul. 13, 2010

(54) GAS FUEL FILLING LID DEVICE FOR VEHICLE

(75) Inventor: Osamu Yamamoto, Nisshin (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 226 days.

(21) Appl. No.: 12/086,178

(22) PCT Filed: Jan. 25, 2007

(86) PCT No.: PCT/JP2007/051654

§ 371 (c)(1),
(2), (4) Date: Jun. 6, 2008

(87) PCT Pub. No.: WO2007/086600

PCT Pub. Date: Aug. 2, 2007

(65) Prior Publication Data

US 2009/0309386 A1 Dec. 17, 2009

(30) Foreign Application Priority Data

Jan. 27, 2006 (JP) .............................. 2006-019703

(51) Int. Cl.
*B60K 15/05* (2006.01)
(52) U.S. Cl. .............................. 296/97.22; 220/DIG. 33
(58) Field of Classification Search ................ 220/86.2, 220/DIG. 33; 277/921; 296/97.22
See application file for complete search history.

(56) References Cited

U.S. PATENT DOCUMENTS

| | | | | |
|---|---|---|---|---|
| 3,750,825 A | * | 8/1973 | Bachle | 220/324 |
| 4,441,533 A | * | 4/1984 | Snyder et al. | 141/59 |
| 4,886,182 A | * | 12/1989 | Fedelem et al. | 220/86.2 |
| 5,072,986 A | * | 12/1991 | Tai et al. | 296/97.22 |
| 5,327,946 A | * | 7/1994 | Perkins | 141/59 |
| 5,658,036 A | * | 8/1997 | Benoist | 296/97.22 |
| 5,735,424 A | * | 4/1998 | Diederiks et al. | 220/203.01 |
| 5,884,958 A | * | 3/1999 | Oddenino | 296/97.22 |
| 5,954,387 A | * | 9/1999 | Fisher | 296/97.22 |
| 6,193,093 B1 | * | 2/2001 | Brunner | 220/234 |
| 6,234,555 B1 | * | 5/2001 | Emmerich et al. | 296/97.22 |
| 6,554,150 B2 | * | 4/2003 | Foltz | 220/86.2 |
| 6,655,424 B2 | | 12/2003 | Kawazu et al. | |
| 6,834,688 B2 | * | 12/2004 | Ono et al. | 141/94 |
| 7,318,460 B2 | * | 1/2008 | Ohishi | 141/98 |

(Continued)

FOREIGN PATENT DOCUMENTS

DE 19517542 A1 * 11/1996

(Continued)

*Primary Examiner*—Glenn Dayoan
*Assistant Examiner*—Paul A Chenevert
(74) *Attorney, Agent, or Firm*—Kenyon & Kenyon LLP

(57) ABSTRACT

A gas fuel filling lid device for a vehicle using a high-pressure gas as the fuel has a fuel filling opening for filling the vehicle with the high-pressure gas fuel, a lid openably attached to the vehicle and covering the fuel filling opening, and a cap for the fuel filling opening. The filling opening cap is fitted to the inner surface of the lid and is connected to and disconnected from the fuel filling opening in operative association with opening and closing of the lid. The structure prevents the user from forgetting to close the filling opening cap and facilitates the connection and disconnection of the filling opening cap.

2 Claims, 7 Drawing Sheets

U.S. PATENT DOCUMENTS

| | | | |
|---|---|---|---|
| 2006/0186146 A1* | 8/2006 | Ohishi | 222/566 |
| 2006/0213576 A1* | 9/2006 | Watkins | 141/350 |
| 2006/0219728 A1* | 10/2006 | Grant | 220/849 |
| 2010/0072774 A1* | 3/2010 | Bar | 296/97.22 |

FOREIGN PATENT DOCUMENTS

| | | | |
|---|---|---|---|
| DE | 197 58 230 A1 | | 7/1998 |
| DE | 600 06 993 T2 | | 10/2004 |
| DE | 10 2005 012 572 A1 | | 8/2005 |
| EP | 304579 A1 | * | 3/1989 |
| EP | 1129881 A1 | * | 9/2001 |
| JP | 44-29453 Y1 | | 12/1969 |
| JP | 54-38716 U | | 3/1979 |
| JP | 63-212127 A | | 9/1988 |
| JP | 3-94323 U | | 9/1991 |
| JP | 04046823 A | * | 2/1992 |
| JP | 08295143 A | * | 11/1996 |
| JP | 11-245674 | | 9/1999 |
| JP | 2002240580 A | * | 8/2002 |
| JP | 2003-291667 A | | 10/2003 |
| JP | 2005075308 A | * | 3/2005 |
| JP | 2009262649 A | * | 11/2009 |

* cited by examiner

GAS FUEL FILLING LID DEVICE FOR VEHICLE

This is a 371 national phase application of PCT/JP2007/051654 filed 25 Jan. 2007, claiming priority to Japanese Patent Application No. 2006-019703 filed 27 Jan. 2006, the contents of which are incorporated herein by reference.

FIELD OF THE INVENTION

The present invention relates to a gas fuel filler lid device for a vehicle using high pressure gas as a fuel, such as a fuel-cell vehicle.

BACKGROUND OF THE INVENTION

In recent years, much research has been directed at developing fuel-cell vehicles equipped with fuel cells for practical use. One example is a vehicle in which a fuel in a gaseous state ("fuel gas") and oxidant gas are supplied into a fuel cell where these gases (reactant gases) are electrochemically reacted to obtain a driving output. Because air can be used as the oxidant gas in this vehicle, it is not necessary to store an oxidant gas inside the vehicle, but only the fuel gas composed of hydrogen. As a method for filling the fuel gas into the vehicle, a similar method as for a gasoline vehicle may be used. Specifically, the fuel gas may be supplied into a fuel gas container provided inside the vehicle by inserting a fuel gas filler nozzle provided at an external fuel gas filling station into a fuel gas filler opening disposed on the vehicle.

For example, Japanese Patent Publication JP 2003-291667 A describes use of a conventional technique for fueling a fuel-cell vehicle with a fuel gas. As shown in FIG. 6, in a conventional technique for fueling a fuel-cell vehicle 11 with a fuel gas, a fuel gas filler nozzle 13 of an external fuel gas supplying device 12 (that is, provided separately from the fuel-cell vehicle 11) is inserted into a fuel gas filler opening 14 of the fuel-cell vehicle 11. Then, fuel gas (hydrogen gas) is transferred into a fuel gas tank 15, which is a tank for storing a fuel gas (hydrogen gas), via the fuel gas filler opening 14 from the fuel gas filler nozzle 13. Further, a grounding line portion 16 of the fuel gas supplying device 12 is connected to the fuel-cell vehicle 11. The grounding line portion 16 is grounded at the fuel gas supplying device 12 to discharge static electricity from the fuel-cell vehicle 11.

As shown in FIGS. 7 and 8, a recess 21 which is concave from the outer surface of a vehicle body 20 is provided on a rear side portion of the body 20 of the fuel-cell vehicle 11. The fuel gas filler opening 14 is disposed obliquely upward on the bottom of the recess 21. A valve mechanism or a filter is mounted inside the fuel gas filler opening 14 in order to prevent back-flow of the fuel gas. Thus, a fuel gas filler opening cap 23 is attached to the fuel gas filler opening 14 to prevent an operational failure of the valve mechanism or filter clogging due to foreign materials having entered into the fuel gas filler opening 14. The fuel gas filler opening cap 23 is manually attached and detached by a person (for example, a driver or a shop attendant) fueling the vehicle with fuel gas.

In a concaved portion 21, there is provided a lid 26 which is swingably attached to the vehicle body 20 via a hinge mechanism 25 such that the lid 26 swings to change between a closed state for closing the recess 21 and an open state for opening the recess 21. When the lid 26 is in a closed state, the fuel gas filler opening 14 and the fuel gas filler opening cap 23 are closed by the lid 26 to achieve a state wherein the opening is inaccessible from outside, while when the lid 26 is in an opened state, the fuel gas filler opening 14 is exposed and accessible from outside.

In order to fuel a conventional fuel-cell vehicle 11 having the above structure with a fuel gas from the fuel gas supplying device 12 by the method as shown in FIG. 6, the person fueling the vehicle should perform procedures including, at first, releasing the lid 26 to expose the fuel gas filler opening 14, manually removing the fuel gas filler opening cap 23 which is covered over the fuel gas filler opening 14, and connecting the fuel gas filler nozzle 13. After completing filling of the fuel gas, the person should manually attach the fuel gas filler opening cap 23 and finally, close the lid 26.

However, because the lid 26 can be closed (set into a closed state) without attaching the fuel gas filler opening cap 23, and because, as in a gasoline vehicle, the fuel gas filler opening 14 is disposed obliquely upward, there is a disadvantage that foreign material may enter the tank if the fuel gas filler opening cap 23 is accidentally left unclosed, even if a drop-prevention string 24 is attached to the fuel gas filler opening 14 as shown in FIGS. 7 and 8 in order to prevent the cap from being dropped or misplaced when the cap is manually removed. Further, another disadvantage is that, because the fuel gas filler opening cap 23 is tightly attached to the fuel gas filler opening 14 in the structure, it may be difficult to manually attach or remove the cap, so an attachment failure may occur. Therefore, an object of the present invention is to prevent the fuel gas filler opening cap 23 from being accidentally left unclosed and to facilitate attachment and removal of the fuel gas filler opening cap 23.

SUMMARY OF THE INVENTION

According to one aspect of the present invention, there is provided a gas fuel filler lid device for a vehicle using high pressure gas as a fuel, comprising a fuel filler opening that is used to fill the high pressure gas to the vehicle; a lid that is mounted on the vehicle to cover the fuel filler opening such that the lid can be freely opened and closed; and a fuel filler opening cap that covers over an outer surface of the fuel filler opening to prevent a foreign material from entering, wherein the fuel filler opening cap is mounted on an internal surface of the lid and includes, on an internal surface, a projecting portion that contacts and seals with the outer surface of the fuel filler opening, and the fuel filler opening cap is attached to or detached from the outer surface of the fuel filler opening in conjunction with opening and closing movement of the lid. According to another aspect of the invention, the fuel filler opening cap may have, at an opening side, an internal diameter which is larger than an internal diameter at a lid side.

Thus, the present invention can prevent the fuel gas filler opening cap from being accidentally left unclosed so as to prevent foreign materials from entering into the fuel gas filler opening, and at the same time, the present invention can facilitate attachment and detachment of the fuel gas filler opening cap.

DETAILED DESCRIPTION

Figure 1:
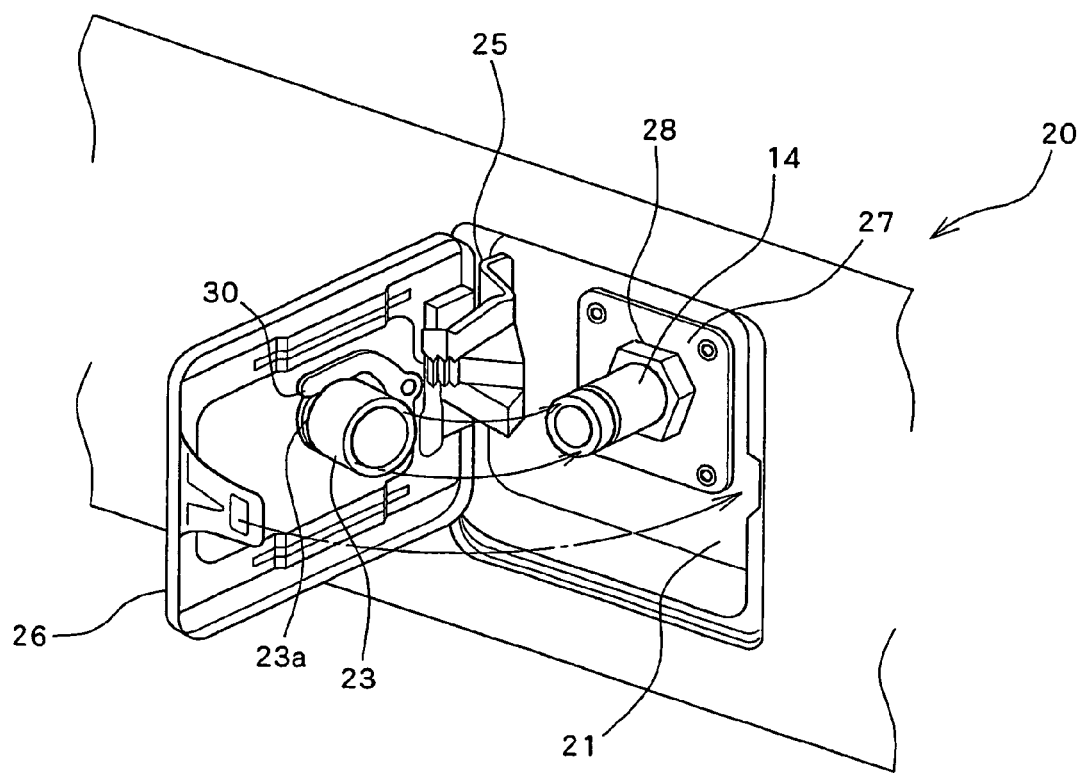
FIG. 1 is a perspective view of an embodiment of a gas fuel filler lid device according to the present invention.

A preferred embodiment of the present invention is described below with reference to the accompanying drawings. Similar reference numbers are used to denote components similar to components used in the conventional art as described above and their explanation is not repeated. FIG. 1 shows a gas fuel filler lid device for a vehicle according to this embodiment of the present invention. In FIG. 1, a fuel gas filler opening 14 is fixed to a bottom of a recess 21 which is provided on a side surface of a vehicle body 20 and extends towards inside the vehicle body 20 in such a manner that the fuel gas filler opening 14 is secured to the vehicle body 20 by nuts 28 clamping both sides of a reinforcing plate 27 inbetween. The tip of the fuel gas filler opening 14 which engages with a fuel gas filler nozzle 13 is placed within the depth of the recess 21 extending towards inside the vehicle. A lid 26 is swingably attached to the vehicle body 20 via a hinge mechanism 25 mounted on the vehicle body 20 such that, in a closed state, the lid 26 covers the recess 21 and the fuel gas filler opening 14, while when the lid 26 is in an opened state the recess 21 and the fuel gas filler opening 14 are exposed. Thus, when the lid 26 is in the opened state, the tip potion of the fuel gas filler opening 14 which engages with the fuel gas filler nozzle 13 and the recess 21 extending towards inside the vehicle are exposed to allow the tip of the fuel gas filler nozzle 13 to enter within the recess 21 such that the bore of the fuel gas filler nozzle 13 engages with the fuel gas filler opening 14 to enable filling with fuel. When the fueling (filling with fuel) is completed, the lid 26 can be closed to cover the recess 21 and the fuel gas filler opening 14. In that state, the surface of the lid 26 is disposed substantially in the same plane with the surface of the vehicle body 20.

Figure 4:
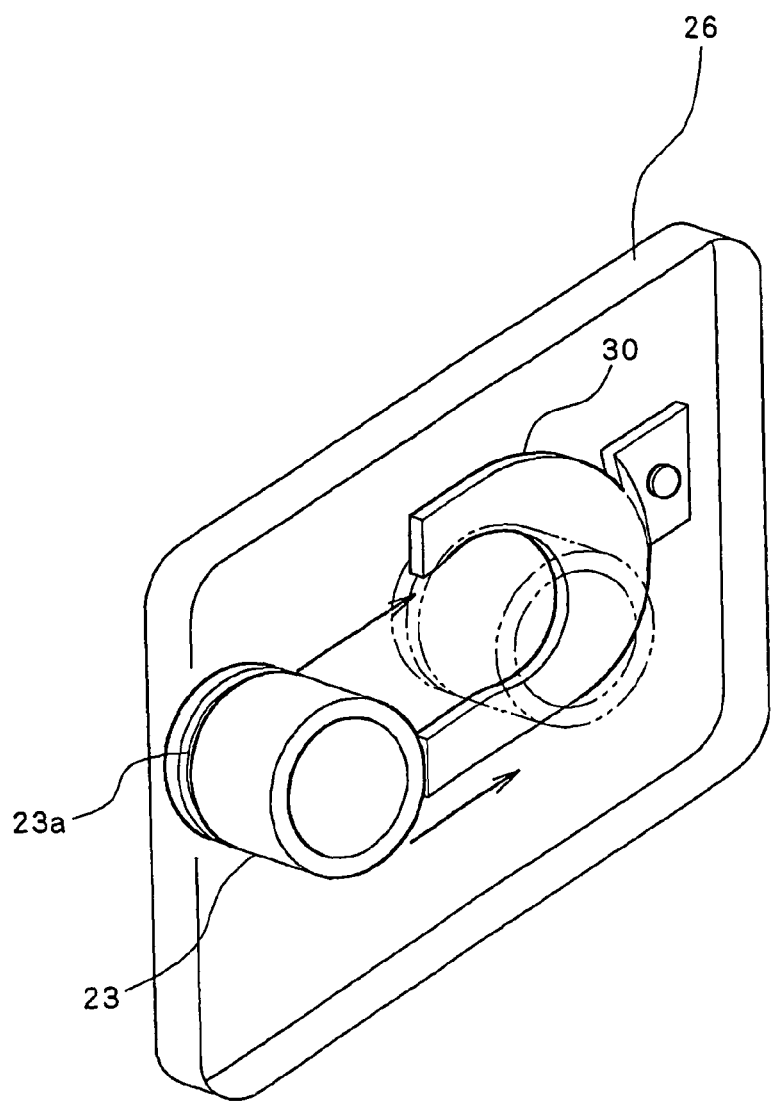
FIG. 4 is a perspective view showing a method for attaching a fuel gas filler opening cap of a gas fuel filler lid device according to an embodiment of the present invention.

A cap stopper 30 which is substantially U-shaped is fixed on a recess side (internal side) of the lid 26. As shown in FIG. 4, the fuel gas filler opening cap 23 is fixed on the concave side of the lid 26 by fitting a fuel gas filler opening cap supporting groove 23a formed around the fuel gas filler opening cap 23 into the cap stopper 30. The fuel gas filler opening cap 23 is made of an elastic material such as rubber and plastic so that the fuel gas filler opening cap 23 can, when it is tightly attached to the outer cylinder surface of the fuel gas filler opening 14, prevent foreign materials from entering into the gas filler opening 14. It should be noted that the form of the cap stopper 30 is not limited to a U-shape, but may be any form as long as the cap stopper 30 can releasably hold the fuel gas filler opening cap 23 by engaging with the fuel gas filler opening cap supporting groove 23a formed on the side surface of the fuel gas filler opening cap 23.

Figure 2:
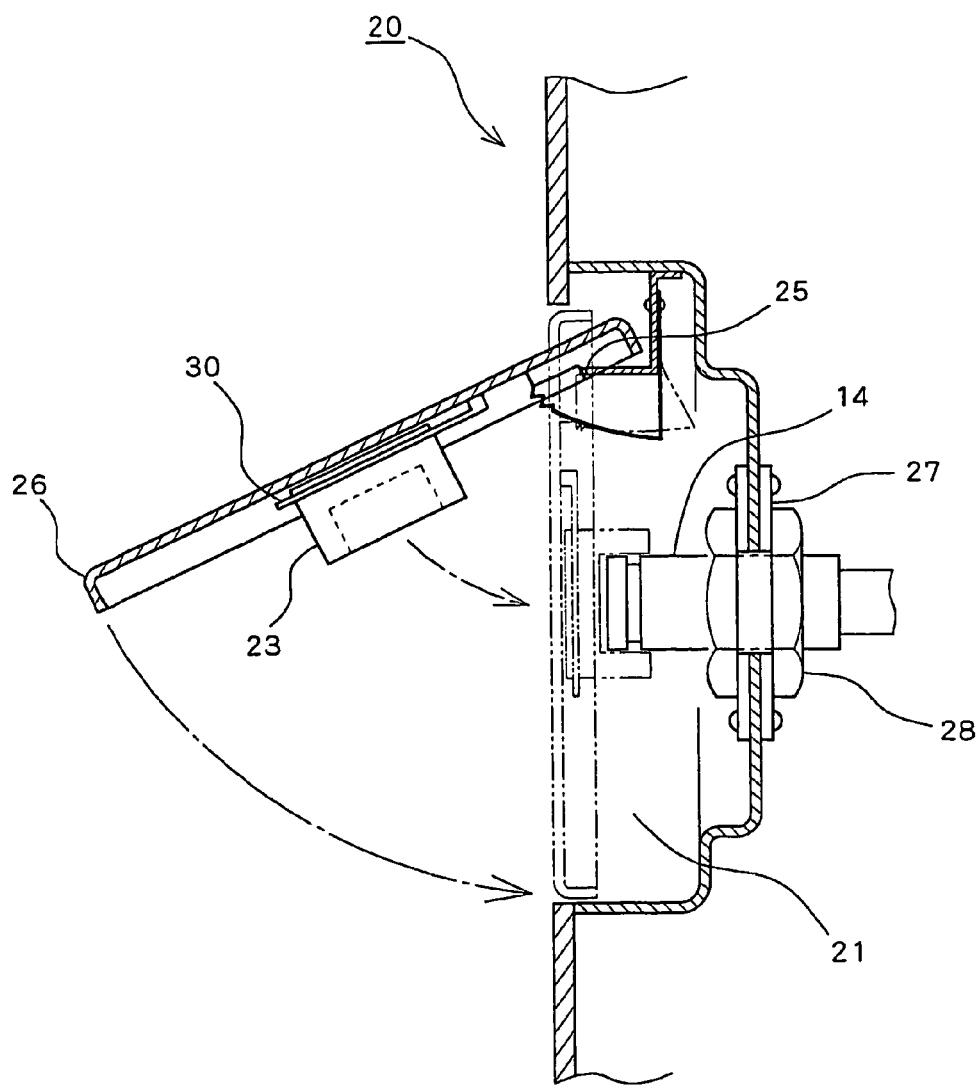
FIG. 2 is a plan sectional view of an embodiment of a gas fuel filler lid device according to the present invention.
Figure 3:
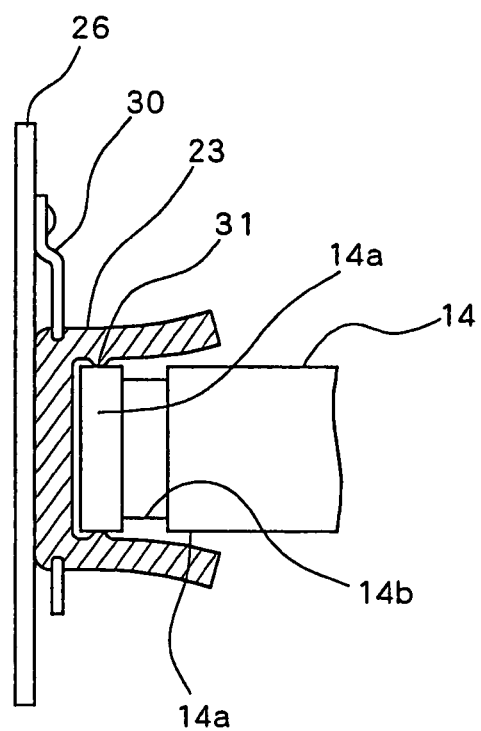
FIG. 3 is a sectional view showing a fuel gas filler opening cap being attached to the fuel gas filler opening of an embodiment of a gas fuel filler lid device according to the present invention.

As shown in FIG. 2, when the lid 26 is swung about the hinge mechanism 25 to open or close the recess 21, the fuel gas filler opening cap 23 can be attached or detached from the fuel gas filler opening 14 in conjunction with such opening and closing movement of the lid 26. As shown in FIG. 3, the fuel gas filler opening 14 includes a stepped-down portion 14b on the outer surface at the tip portion for engaging with the fuel gas filler nozzle 13, and sealing portions 14a, which sandwich the stepped-down portion 14b, for sealing gas between the fuel gas filler nozzle 13 and the fuel gas filler opening 14. The fuel gas filler opening cap 23 internally includes a fuel gas filler opening cap sealing portion 31 which is annular shaped and projecting towards inside. The fuel gas filler opening cap sealing portion 31 contacts and tightly seals with the fuel gas filler opening 14 at the sealing portion 14a of fuel gas filler opening 14. Because foreign materials can be prevented from entering without tightly attaching other portions of the internal surface of the fuel gas filler opening cap 23 than the fuel gas filler opening cap sealing portion 31 to the outer surface of the fuel gas filler opening 14, the fuel gas filler opening cap 23 is formed to have a slight gap as shown in FIG. 3. Further, the fuel gas filler opening cap 23 has a shape such that the internal diameter at the opening side is larger than the internal diameter at the lid side. Thus, because in opening or closing the lid 26, the fuel gas filler opening cap 23 is not impeded such as by being caught at the edge of the fuel gas filler opening 14, the fuel gas filler opening cap 23 can be smoothly attached or detached in conjunction with opening or closing movement of the lid 26. Still further, because the fuel gas filler opening cap sealing portion 31 contacts in a line with the sealing portion 14a which is disposed at the outer circumference of the fuel gas filler opening 14, frictional resistance in attaching and detaching the fuel gas filler opening cap 23 is low enabling smoother attachment and detachment.

In the above described embodiment of the present invention, the fuel gas filler opening cap 23 is fixed by being inserted into the cap stopper 30 mounted inside of the lid 26 so that it is possible to exchange the fuel gas filler opening cap 23 and to facilitate assembly. However, the fuel gas filler opening cap 23 may be directly fixed to the concave side of the lid 26 by adhesive agent or the like. Further, the lid 26 may be swingably attached to the vehicle by means other than the hinge mechanism 25, such as by a flexible material including rubber and resin.

According to the present invention, because the fuel gas filler opening cap 23 can be attached to or detached from the fuel gas filler opening 14 in conjunction with opening and closing of the lid 26, advantages are provided in that it is possible to prevent the fuel gas filler opening cap 23 from being accidentally left unclosed and to enable smooth attachment and detachment of the fuel gas filler opening cap 23 in conjunction with the opening and closing of the lid 26.

Figure 5:
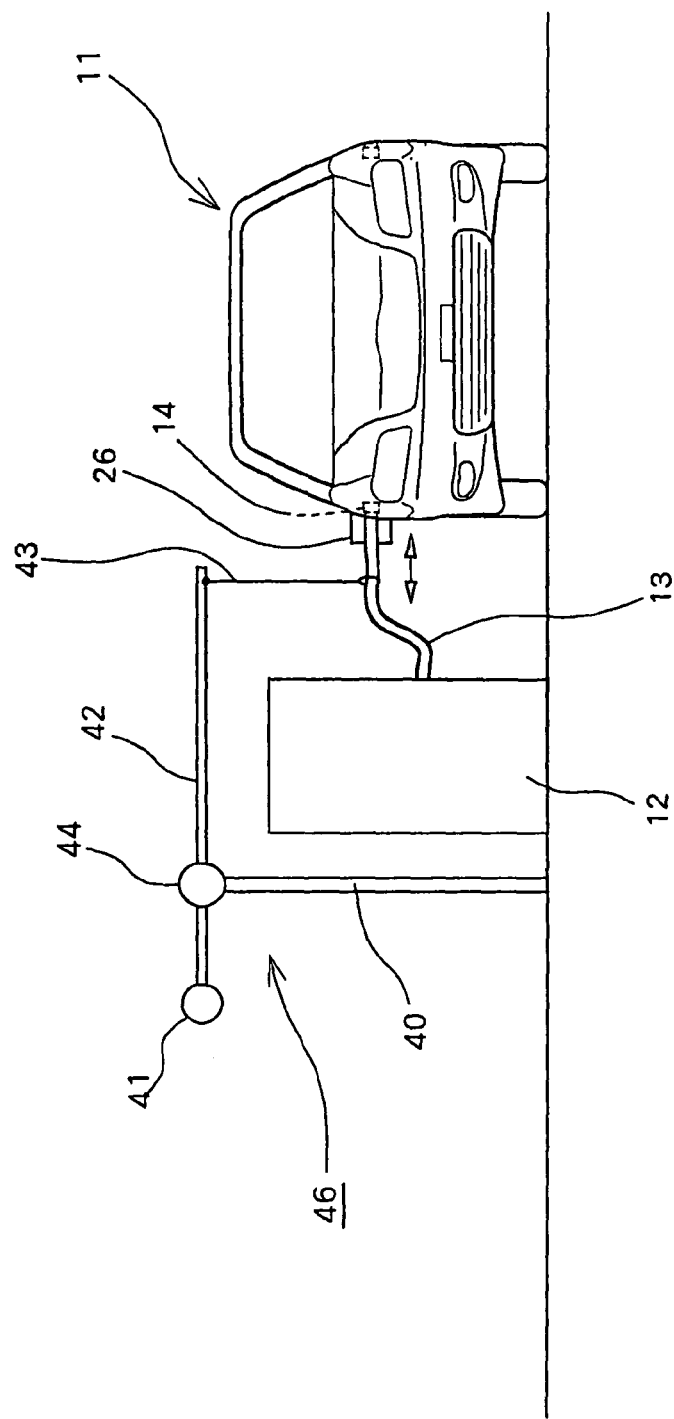
FIG. 5 is a diagram explaining a method for filling fuel gas using a gas fuel filler lid device according to an embodiment of the present invention.
Figure 6:
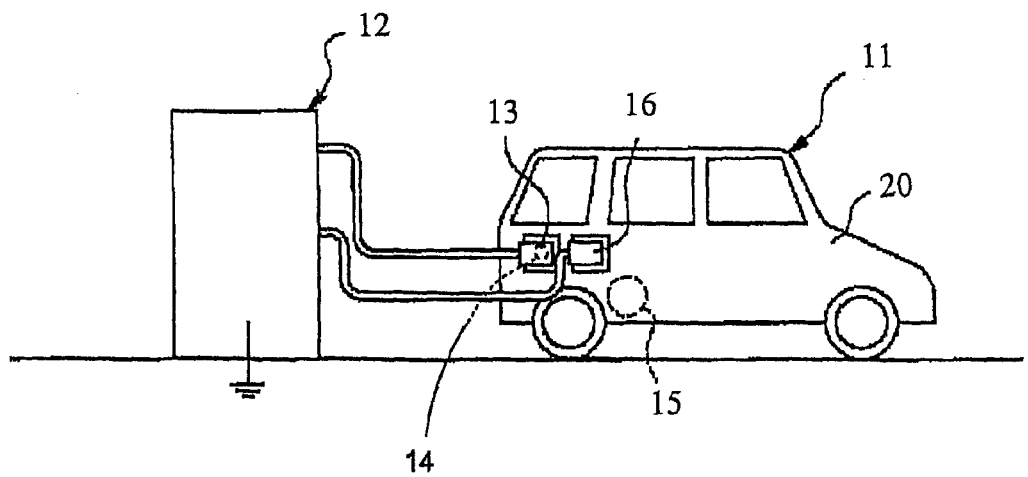
FIG. 6 is a diagram explaining a method for filling fuel gas according to a conventional art.
Figure 7:
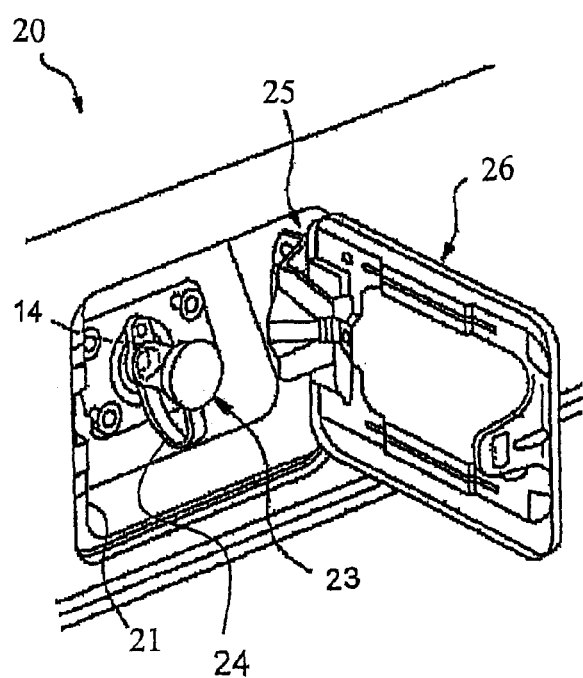
FIG. 7 is a perspective view showing a fuel gas filler opening and a lid according to a conventional art.
Figure 8:
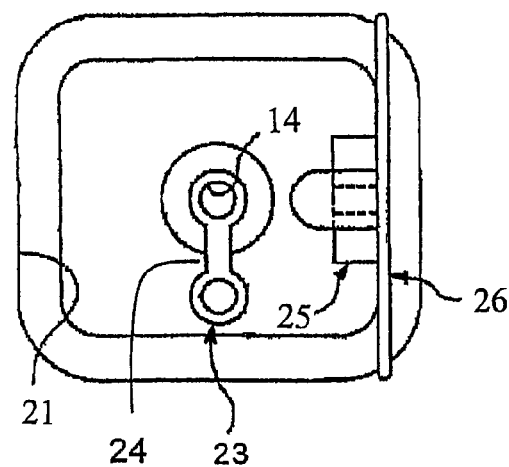
FIG. 8 is a front view showing a fuel gas filler opening and a lid according to a conventional art.

Moreover, the fuel gas filler nozzle 13 can be inserted into the fuel gas filler opening 14 in a horizontal direction by mounting the fuel gas filler opening 14 horizontally to the fuel-cell vehicle 11 and by using a balancing unit 46 shown in FIG. 5 in which a supporting rod 42 is connected to one end of a column 40 by a hinge 44, a weight 41 is connected to one end of the supporting rod 42, and a wire 43 for lifting the fuel gas filler nozzle 13 is attached to the other end of the supporting rod 42 at the side where the fuel gas supplying device 12 is disposed. By providing a structure in which the fuel gas filler opening 14 is disposed in a horizontal direction as described above, the lid 26 is opened and closed in a horizontal direction, and the fuel gas filler opening cap 23 which is attached or detached in conjunction with the opening and closing of the lid 26 is provided, it is possible to achieve the advantages of preventing foreign materials from entering into the fuel gas filler opening 14 and facilitating filling of the fuel-cell vehicle 11 with fuel gas.

In the above embodiment of the present invention, the present invention is explained using examples of its application to a fuel-cell vehicle 11. However, it should be noted that the present invention is applicable to any vehicle using a high-pressure gas fuel, such as, for example, a natural gas vehicle.

The invention claimed is:

1. A gas fuel filler lid device for a vehicle using high pressure gas as a fuel, comprising:
   a fuel filler opening that is used when fueling the vehicle with the high pressure gas; the fuel filler opening having an annular terminal surface and a cylindrical outer surface;
   a lid that is mounted on the vehicle to cover the fuel filler opening such that the lid can be freely opened and closed; and
   a fuel filler opening cap that covers the cylindrical outer surface of the fuel filler opening to prevent foreign material from entering,
   wherein the fuel filler opening cap is mounted on an internal surface of the lid and includes, on an internal surface, a radially-inward projecting portion which contacts and seals with the outer surface of the fuel filler opening, and the fuel filler opening cap is attached to or detached from the outer surface of the fuel filler opening in conjunction with opening and closing movement of the lid.

2. The gas fuel filler lid device for the vehicle using high pressure gas as the fuel according to claim 1, wherein the fuel filler opening cap has, at an opening side, an internal diameter which is larger than an internal diameter at a lid side.

* * * * *